United States Patent [19]

Baynes

[11] 4,245,505

[45] Jan. 20, 1981

[54] INDICATOR OF AMOUNT OF LIQUEFIED GAS IN BOTTLE

[75] Inventor: William R. Baynes, DuQuoin, Ill.

[73] Assignee: Turco Manufacturing Co., DuQuoin, Ill.

[21] Appl. No.: 61,750

[22] Filed: Jul. 30, 1979

[51] Int. Cl.³ .................. A47J 37/08; G01F 23/20
[52] U.S. Cl. .................................. 73/296; 126/41 R; 177/245
[58] Field of Search .............. 73/296; 177/256, 168, 177/170, 173; 126/41 R; D7/108, 109

[56] References Cited

U.S. PATENT DOCUMENTS

| 1,501,124 | 7/1924 | Löffler | 73/296 |
| 2,015,689 | 10/1935 | Odell | 73/296 |
| 2,575,110 | 11/1951 | Kerr | 73/296 X |
| 2,821,854 | 2/1958 | Franke | 73/296 |
| 3,789,822 | 2/1974 | Schantz et al. | 126/41 R |
| 3,891,040 | 6/1975 | Schmitter | 177/173 X |

FOREIGN PATENT DOCUMENTS 1077392 11/1954 France ............................ 73/296

OTHER PUBLICATIONS

Publ. "Sunbeam Grillmaster Gas Barbecue Appliance" Catalog Models 9490, 9480, Neosho Products Division, 2 pages 1979.

Primary Examiner—Daniel M. Yasich
Attorney, Agent, or Firm—Rogers, Eilers & Howell

[57] ABSTRACT

A movable platform supports a bottle for liquefied petroleum gas, a pointer is connected to that platform to move when that platform moves, and adjustable spring means urge that platform to move in a direction which will move that pointer toward an "empty" position but that adjustable spring means will permit a "full" bottle to hold that platform in a position wherein that pointer is spaced away from that empty position.

12 Claims, 9 Drawing Figures

INDICATOR OF AMOUNT OF LIQUEFIED GAS IN BOTTLE

FIELD OF THE INVENTION

A portable cooking grill can use liquefied petroleum gas as the heat source therefor, and that gas usually will be held within a bottle which is mounted on the base of that grill. Unless an indicator is provided to indicate when the amount of gas within that bottle is low, the supply of gas could become depleted during use of that grill.

PRIOR ART

Indicating meters are usable with bottles for liquefied petroleum gas to indicate the amount of gas in those bottles. However, such meters are expensive; and suppliers of liquefied petroleum gas sometimes fail to make certain that each owner receives his own bottle.

SUMMARY OF THE INVENTION

A platform is movably secured to the base of a portable cooling grill, a gas bottle can be mounted on that platform, a pointer is connected to that platform to move when that platform moves, and adjustable spring means bias that pointer toward an "empty" position but permit a "full" bottle to hold that pointer away from that position. During initial use of the grill, that pointer will be adjacent a "full" position; but, as the amount of liquefied petroleum gas in the bottle is decreased, the adjustable spring means will cause that pointer to move toward the "empty" position. The platform, the pointer, and the adjustable spring means provide a direct and automatic movement of the pointer from the "full" position toward the "empty" position as the liquefied petroleum gas is used to supply heat for cooking. It is, therefore, an object of the present invention to provide a movable platform, a pointer, and adjustable spring means which enables the amount of gas within a bottle on that platform to determine the position of that pointer relative to an "empty" position.

Other and further objects and advantages of the present invention should become apparent from an examination of the drawing and accompanying description.

In the drawing and accompanying description two preferred embodiments of the present invention are shown and described but it is to be understood that the drawing and accompanying description are for the purpose of illustration only and do not limit the invention and that the invention will be defined by the appended claims.

DESCRIPTION OF PREFERRED EMBODIMENTS

Figures 2, 3, 4, 5:
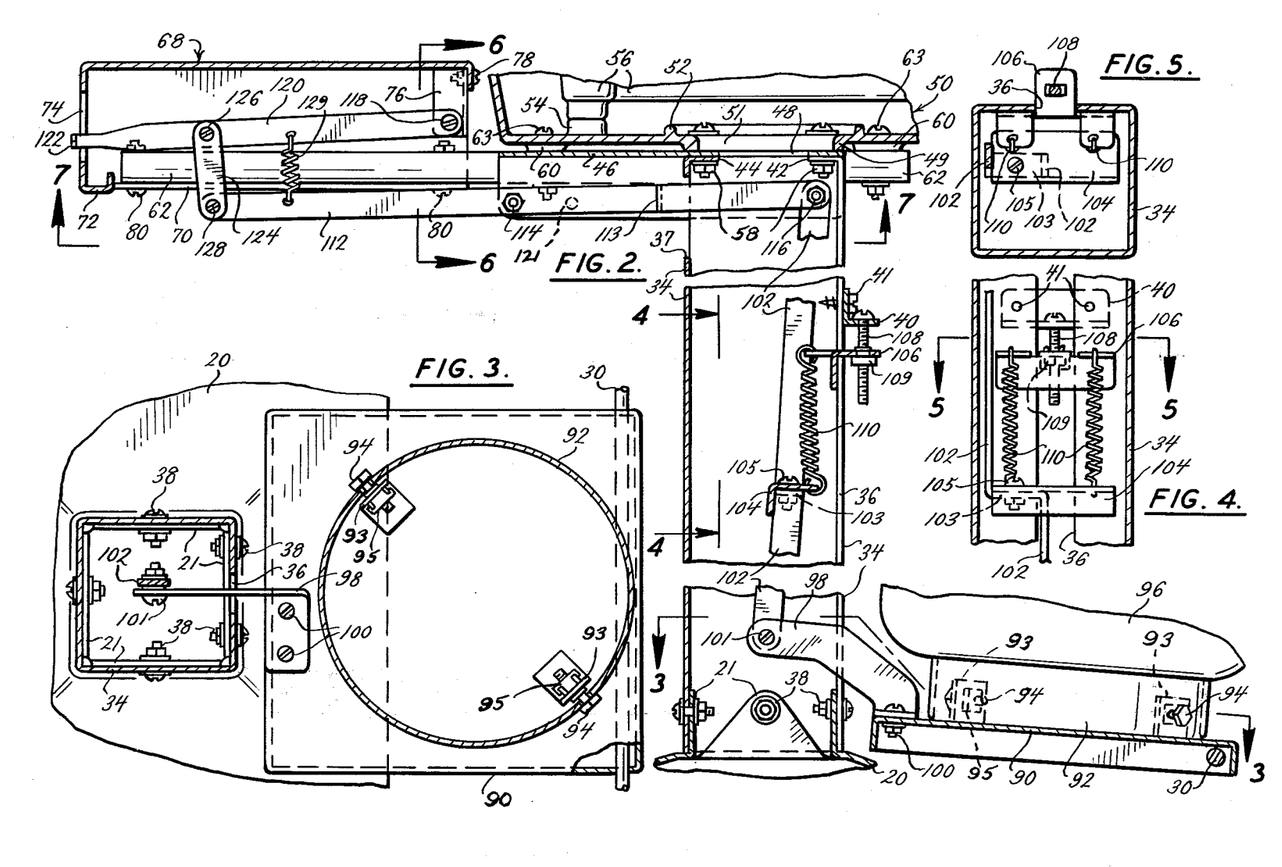
FIG. 2 is a partially broken away vertical section, on a larger scale, through the portable cooking grill of FIG. 1.
FIG. 3 is a sectional view, on the scale of FIG. 2, which is taken along the broken plane indicated by the broken line 3—3 in FIG. 2.
FIG. 4 is another sectional view on the scale of FIG. 2, and it is taken along the plane indicated by the line 4—4 in FIG. 2.
FIG. 5 is still another sectional view on the scale of FIG. 2, and it is taken along the plane indicated by the line 5—5 in FIG. 4.

Referring to the drawing in detail, the numeral 20 denotes the base of a portable cooking grill; and that base has four upstanding ears 21 of generally-triangular configuration, as shown particularly by FIGS. 2 and 3. Runners 22 and 24 of tubular form are secured to the under sides of the opposite edges of that base by nut and bolt combinations 25. Cup-like tips 26 and 28 of plastic material are telescoped over the forward ends of the runners 22 and 24. The numeral 30 denotes an axle which has the opposite ends thereof extending through aligned openings in the rear ends of the runners 22 and 24. Wheels 32 are rotatably mounted on that axle to render the cooking grill readily portable.

The numeral 34 denotes a pedestal of generally-square cross section, which is formed by folding a flat sheet of metal to define three essentially-closed sides and a fourth side that has an elongated vertical slot 36. A rectangular opening 37 is provided in the front side of the pedestal 34, as indicated particularly by FIG. 6. Nut and bolt combinations 38 extend through openings in the lower portions of the sides of pedestal 34 and through the ears 21 on the base 20 to fixedly secure that pedestal to that base. An L-shaped bracket 40 spans the vertically-directed slot 36 in the rear side of pedestal 34; and that bracket is secured to portions of that rear side by self-tapping screws 41. As shown particularly by FIG. 2, the horizontally-directed portion of that L-shaped bracket extends outwardly from the rear wall of the pedestal 34. Ears 42 are provided at the top of the pedestal 34; and those ears are horizontally-bent portions of the rear side of that pedestal. A horizontally-directed flange 44 is provided at the top of pedestal 34; and that flange is a horizontally-bent portion of the front wall of that pedestal.

Figures 1, 6:
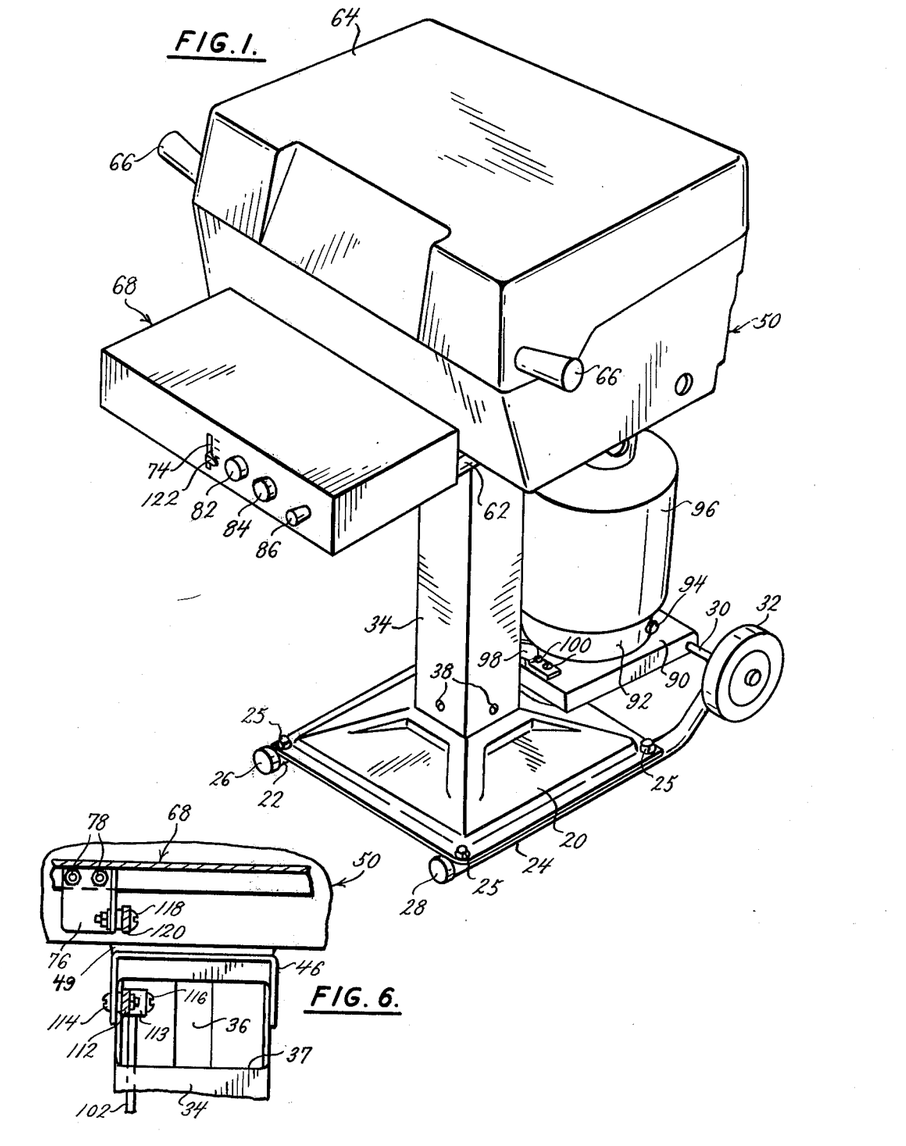
FIG. 1 is a perspective view of a portable cooking grill which embodies the principles and teachings of the present invention.
FIG. 6 is a still further sectional view on the scale of FIG. 2, and it is taken along the plane indicated by the line 6—6 in FIG. 2.
Figure 7:
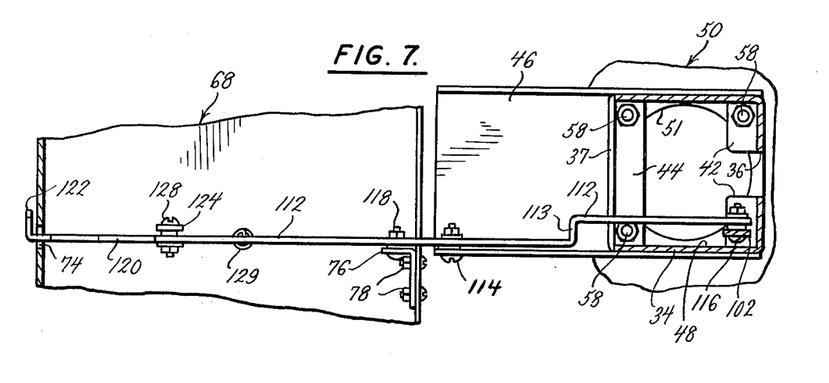
FIG. 7 is yet another sectional view on the scale of FIG. 2, and it is taken along the plane indicated by the line 7—7 in FIG. 2.

The numeral 46 denotes a horizontally-directed bracket of U-shaped cross section which is shown in FIGS. 2, 6 and 7. An opening 48 is provided in the web of that horizontally-directed bracket; and that opening is generally in register with the pedestal 34, as indicated by FIGS. 2 and 7. Some portions of that web overlie that ears 42 and the flange 44 at the top of pedestal 34, as indicated particularly by FIG. 2.

The numeral 50 generally denotes the lower portion of the cooking chamber for the portable cooking grill; and a relatively-large boss 49 of rectangular form is provided at the lower face of the bottom of that lower portion, as shown particularly by FIG. 2. That boss helps define a relatively large opening 51 in the bottom of the lower portion 50 of the cooking chamber. A ridge 52 extends upwardly from the bottom of the lower portion 50 to serve as a dam that will keep any meat juices and grease, which tend to collect in the bottom of the lower portion 50, from flowing to and passing downwardly into the pedestal 34. The numeral 54 denotes one of a number of bosses which extend upwardly from the upper surface of the bottom of the lower portion 50; and those bosses support two gas burners 56, one of which is shown in FIG. 2. Nut and bolt combinations 58 fixedly secure the lower portion 50 of the cooking chamber and the horizontally-directed bracket 46 to the upper end of the pedestal 34. The numeral 60 denotes bosses that extend downwardly from the lower surface of the bottom of the lower portion 50 at points which are intermediate the boss 49 and the side edges of that lower portion. Tubular supports 62 are fixedly secured to the bosses 60, and hence to the lower portion 50 of the cooking chamber, by nut and bolt combinations 63. As indicated by FIG. 2, the tubular supports 62 extend a substantial distance forwardly beyond the front edge of the lower portion 50 of the cooking chamber. The numeral 64 denotes the upper portion of that cooking chamber; and that upper portion is pivotally secured to that lower portion by hinges, not shown, at the rear of that cooking chamber. Handles 66 of insulating material are secured to the opposite sides of the upper portion 64 of the cooking chamber; and those handles can be used to raise or lower the free edge of that upper portion.

The numeral 68 denotes a table or shelf which is made from sheet metal and which has downwardly-extending sides and a downwardly-extending front, as indicated by FIGS. 1 and 2. Inwardly-extending flanges 70 at the lower edges of the sides of that table are secured to the forward ends of the tubular supports 62 by nut and bolt combinations 80. A flange 72 is provided at the lower edge of the front of the table or shelf 68, and the rear edge of that flange is bent upwardly as shown by FIG. 2. A vertically-directed slot 74 is provided in the front wall of the table or shelf 68; and a "full" mark will be provided adjacent the upper end of that slot to denote a "full" position, and an "empty" mark will be provided adjacent the lower end of that slot to denote an "empty" position. An L-shaped bracket 76 is secured to a downwardly-directed flange at the rear of the shelf or table 68, as indicated by FIGS. 2 and 4; and that bracket is secured to that flange by nut and bolt combinations 78. Three openings, not shown, are provided in the front wall of the shelf or table 68; and control knobs 82 and 84 are mounted adjacent two of those openings to control the supply of gas to the two burners 56 within the lower portion 50 of the cooking chamber. The numeral 86 denotes a knob which is disposed adjacent the third of those openings to actuate an igniter for the gas which is supplied to those burners.

The numeral 90 in FIGS. 1–3 and 8 denotes a platform which has four downwardly-depending sides. Openings adjacent the rear ends of two of those sides accommodate the axle 30, and hence permit that platform to pivot about that axle. Ears 93 are punched out of, and extend upwardly from, the upper surface of the platform 90; and each of those ears has a nut 95 secured to it. A ring 92, which is provided at the bottom of each standard bottle 96 for liquefied petroleum gas, is dimensioned to telescope downwardly over the ears 93, which comprise positioning means. Clamping screws 94 are carried by horizontally-directed openings in the ring 92; and those screws can releasably secure bottle 96 to platform 90 by being threaded into the nuts 95. Connecting means comprising a bracket 98 has the lower end thereof secured to the forward end of platform 90 by nut and bolt combinations 100; and it has the upper end thereof extending through the elongated slot 36 in the rear wall of the pedestal 34, as shown particularly by FIGS. 2 and 3. An elongated connecting lever 102 has a horizontal offset 103 intermediate the length thereof; and that offset is shown particularly by FIGS. 2 and 4. A pivot 101 rotatably secures the lower end of that connecting lever to the upper end of the bracket 98; and hence that connecting lever will move with the forward end of platform 90. An L-shaped connector 104 overlies the horizontal offset 103 of the connecting lever 102, as shown particularly by FIGS. 2 and 4; and that connector is secured to that offset by a nut and bolt combination 105.

The numeral 106 denotes a generally T-shaped bracket which has a vertically-directed portion that is disposed at the inner surface of the rear wall of pedestal 34; and that portion is long enough to span, and extend beyond, the slot 36, as shown particularly by FIGS. 4 and 5. A horizontally-directed ear of bracket 106 extends rearwardly through and beyond the slot 36; and two additional horizontally-directed ears of that bracket extend inwardly and away from the rear side of pedestal 34. The configuration of bracket 106 is shown particularly by FIGS. 2, 4 and 5. An adjusting screw 108 has the shank thereof extending downwardly through an opening in the horizontally-directed portion of L-shaped bracket 40, and also extending through an opening in the rearwardly-extending ear of T-shaped bracket 106, as shown particularly by FIG. 5. A nut 109, at the lower face of that rearwardly-extending ear on that T-shaped bracket, receives the shank of adjusting screw 108; and that nut is held stationary relative to that ear. As a result, rotation of that adjusting screw can change the position of that T-shaped bracket relative to the L-shaped bracket 40.

The numeral 110 denotes two vertically-directed helical extension springs; and those springs have the lower ends thereof hooked through openings in the horizontally-directed portion of the L-shaped connector 104, as shown by FIGS. 2 and 4. One of those springs has the upper end thereof hooked through an opening in one of the two forwardly-extending ears of T-shaped bracket 106; and the other of those springs has the upper end thereof hooked through an opening in the other of those two ears. Those springs urge the connector 104, the connecting lever 102, the pivot 101, the bracket 98 and the forward end of the platform 90 upwardly. However, those springs can respond to the weight of bottle 96 plus the weight of gas therein to extend, and thereby permit connector 104, connecting lever 102, pivot 101, bracket 98 and the forward end of the platform 90 to move downwardly relative to the base 20 and the pedestal 34.

The numeral 112 denotes an elongated lever which is pivotally secured to one flange of the horizontally-directed bracket 46 by a pivot 114, as shown by FIGS. 2, 6 and 7. That lever has an offset 113 therein, as shown by FIGS. 2, 6 and 7; and that offset displaces the rear end of that lever inwardly from the adjacent side of pedestal 34. A pivot 116 rotatably secures the offset rear end of lever 112 to the upper end of the connecting lever 102.

The numeral 118 denotes a pivot which is secured to the L-shaped bracket 76 adjacent the rear of the shelf or table 68, as indicated by FIGS. 2 and 7. A lever 120, which has a pointer 122 at the free end thereof, is rotatably secured to bracket 76 by pivot 118. As shown by FIGS. 1 and 2, that pointer is disposed forwardly of, but immediately adjacent, the slot 74 in the front wall of the shelf or table 68; and that slot permits that pointer to move vertically. A connecting link 124 has the upper end thereof secured to the lever 120 by a pivot 126, and has the lower end thereof secured to the lever 112 by a pivot 128. A helical extension spring 129 has the upper end thereof hooked through an opening in the lever 120, and has the lower end thereof hooked through an opening in the lever 112.

The bottle 96 is connected to the burners 56 by a pressure-reducing regulator, not shown, of standard and usual design, and by a flexible hose, not shown, of standard and usual design. That flexible hose permits free and ready movement of the bottle 96 throughout short distances relative to the burners 56 and the lower portion 50 of the cooking chamber. As a result, the weight of the bottle 96 and of the gas therein will be the dominant force which will tend to cause the platform 90 to rotate downwardly about the axle 30. The springs 110 will yield to permit downward movement of the forward end of the platform 90 when the bottle 96 is full of gas; and the downward movement of that forward end will act through bracket 98, pivot 101, connecting lever 102, pivot 116, lever 112, pivot 128, connecting link 124 and pivot 126 to cause lever 120 to dispose the pointer 122 adjacent the "full" mark at the upper end of the slot 74.

The weight of bottle 96 may not be exactly the same as the weight of other, generally-similar bottles; but the weights of all generally-similar bottles will be about the same. Also, the weight of a full charge of gas may vary from bottle to bottle; but the weights of full charges of gas will be about the same. As a result, it is possible to select springs 110 which will permit the weight of a "full" bottle 96 to cause the pointer 122 to approach the upper end of slot 74 but which will respond to the weight of an "empty" bottle to cause that pointer to approach the lower end of that slot. The difference between the weight of a "full" bottle and an "empty" bottle is about eighteen pounds. Because the weights of all generally-similar bottles will not be exactly the same, the user of the portable cooking grill should place his empty bottle 96 on the platform 90, and then rotate the adjusting screw 108 until the forces provided by the springs 110 cause the pointer 122 to be disposed immediately adjacent the lower end of the slot 74. Therafter, that user will remove that bottle from platform 90, will have that bottle filled, and then will again place that bottle on that platform. The weight of the gas within that bottle will extend the springs 110 sufficiently to cause the pointer 122 to move to a "full" position adjacent the upper end of the slot 74.

The pointer 122 will remain adjacent the upper end of slot 74 as long as no gas is used. However, as gas is used during the cooking of food in the cooking chamber, the combined weight of bottle 96 and of the gas therein will decrease. The springs 110 will respond to the decrease in weight to pull the connecting lever 102, and hence the forward end of the platform 90, upwardly. Thereupon, that connecting lever will cause lever 112 to rotate in the counterclockwise direction in FIG. 2; and connecting link 124 and spring 129 will cause the lever 120 to rotate in the same direction to move the pointer 122 downwardly away from the upper end of slot 74. When the supply of gas in the bottle 96 reaches a level at which it should be replenished, to make certain that the user of the portable cooking grill will not run out of gas during the cooking of a meal, the springs 110 will have raised the forward edge of the platform 90 far enough to cause the pointer 122 to be close to the "empty" position represented by the lower end of slot 74. This means that the user of the portable cooking grill will have ample notification of the need of replenishing the supply of gas within the bottle 96. At such time, that user will disconnect that bottle and take it to a supplier of liquefied petroleum gas to have it refilled.

If the user of the portable cooking grill has his own bottle returned to him, and if that bottle is filled to the same extent it was filled when the adjusting screw 108 was set, the pointer 122 will be adjacent the upper end of slot 74 when that bottle is clamped into position on platform 90. Further, that pointer will be adjacent the lower end of that slot when the supply of gas within that bottle decreases to the point where it should be replenished. As a result, the present invention provides an automatic, easily-visible indication, to the user of the portable cooking grill, of the need of replenishing the supply of gas in the bottle 96.

Even if the supplier of liquefied petroleum gas does not return a user's own bottle to him, that supplier will supply a bottle which has a weight and a gas-holding capacity which are very similar to those of the user's own bottle. As a result, no adjustment of the adjustment screw 108 will be needed, as long as the user of the portable cooking grill receives his own bottle 96 or an essentially-similar bottle from the supplier of liquefied petroleum gas.

The ears 93 and the clamping screws 94 will hold the bottle 96 so the horizontal projection of the center of gravity of that bottle is spaced from the axle 30 a distance which is substantially less than the distance by which the horizontal projection of the pivot 101 is spaced from that axle. In the embodiment of FIGS. 1–7, the horizontal projection of the center of gravity of the bottle 96 is spaced from the axle 30 a distance which is only one-third of the distance by which the horizontal projection of the pivot 101 is spaced from that axle. As a result, the springs 110 need support only one-third of the combined weight of the bottle 96 and of the gas therein. That bottle will weigh about eighteen pounds, and the combined weights of the regulator and hose therefor will be between one and two pounds. The weight of a charge of liquefied petroluem gas will be about eighteen pounds; so the combined weight of a "full" bottle and of its regulator and hose will be about thirty-seven or thirty-eight pounds. The mechanical advantage, which is provided by making the spacing between the center of gravity of the horizontal projection of the bottle 96 and axle 30 only one third of the distance between the horizontal projection of the pivot 101 and that axle, reduces the amount of weight which must be supported by the springs 110 to less than thirteen pounds. Because two springs 110 are used, each of those springs need not support more than seven and one-half pounds of weight. This is desirable; because it permits small springs 110 to be used; and manufacturers of small springs tend to maintain the dimensions and performance characteristics of small springs to tolerances which are much closer than the tolerances found in the dimensions and performance characteristics of large springs. Also, this is desirable, because small springs are less expensive and are easier to install than are large springs.

The mechanical advantage, which is provided by making the spacing between the horizontal projection of the center of gravity of the bottle 96 and axle 30 only one-third of the distance between the horizontal projection of the pivot 101 and that axle, also reduces the amount of flexing that must occur in the hose which connects bottle 96 to the burners 56. The maximum movement of pivot 101, as the pointer 122 moves from the "full" position adjacent the upper end of slot 74 to the "empty" position adjacent the lower end of that slot, is about fifteen-sixteenths of an inch. Because the movement of bottle 96 is only about one-third of the movement of pivot 101, the flexing in the hose need not exceed five-sixteenths of an inch.

The springs 110 will experience a given extension in response to the placing of an "empty" bottle 96 on the platform 90, but after those springs have experienced that extension, they will dispose the pointer 122 adjacent the lower end of the slot 74. Those springs will experience a longer extension in response to the placing of a "full" bottle on that platform; but that "full" bottle extension will be only fifteen-sixteenths of an inch longer than the "empty" bottle extension. Neither the "empty" bottle extension nor the "full" bottle extension of either spring 110 is large enough to unduly stress either of those springs, neither of those extensions could fatigue either of those springs, neither of those extensions could cause a "drifting" of the calibration of either of those springs, and neither of those extensions could cause either of those springs to take a "set".

The left-hand end of lever 112 will respond to downward movement of pivot 101, connecting lever 102 and pivot 116 to move connecting link 124 upwardly; and lever 120 will respond to the upward movement of the left-hand end of lever 112 to move the pointer 122 upwardly. It will be noted that connecting link 124 is pivoted to lever 120 at a point which is intermediate the pivot 118 and the pointer 122; and hence that pointer will experience a greater vertical movement than will the connecting link 124. The resulting mechanical advantage is desirable because it permits the fifteen-sixteenths of an inch extension of the springs 110 to provide a vertical movement of greater than one and three-eighths inches for the pointer 122.

The horizontally-directed bracket 46 has an opening 121 in that flange thereof which supports the pivot 114; and that opening is spaced one inch to the right of that pivot. Where a portable cooking grill is equipped with a cooking chamber which is four inches narrower than the dual-burner cooking chamber of FIG. 1, the pivot 114 will be removed from the opening in which it is disposed and set within the opening 121. Also, both ends of lever 112 will be shortened by one inch to enable the connecting link 124 to be connected to that lever and to the lever 120 in the manner shown by FIG. 2; and the table or shelf 68 will be shifted to the right a distance of two inches. The shortening of the ends of lever 112 will not cause the vertical movement of connecting link 124 to be greater than the vertical movement of pivot 116. As a result, the total vertical movement of the pointer 122 will be the same as it is where the portable cooking grill is equipped with a dual-burner cooking chamber. Consequently, the vertical movement of that pointer, in response to the depletion of the gas in bottle 96, will not exceed the height of slot 74; and that pointer will be close to the "empty" position adjacent the lower end of that slot whenever the supply of gas within that bottle should be replenished.

The connecting link 124 and the lever 120 are desirable because they enable the pointer 122 to be disposed within, and to move relative to, the slot 74 even though the major portion of the length of that slot is located above the level of the top of pedestal 34. As a result, that slot can be located in the front wall of the table or shelf 68, and hence will be readily visible at all times.

All of the foregoing shows that the user of the portable cooking grill of FIGS. 1-7 can set the pointer 122 adjacent the "empty" position in slot 74 when his empty bottle 96 is clamped in position on platform 90, have that bottle filled with gas, re-clamp that bottle in position on that platform, and thereafter have a continuous, readily-visible indication of the amount of gas in that bottle. Further, it shows that when that user replaces his "empty" bottle with his refilled bottle or with a "full" bottle of the same kind and weight, the pointer 122 will automatically move to the "full" position. As a result, the user of the portable cooking grill of FIGS. 1-7 will have ample notice of the fact that the supply of gas is running low, and hence will be able to replenish that supply before it is depleted.

The spring 129 would cause the lever 120 to closely follow the lever 112, even if any "looseness" or "play" existed between the link 124 and either of the levers 112 and 120 because of manufacturing tolerances. As a result, the movement of lever 112, in response to changes in the weight of the gas within the bottle 96, will enforce a corresponding movement of the lever 120 and hence of the pointer 122.

Figures 8, 9:
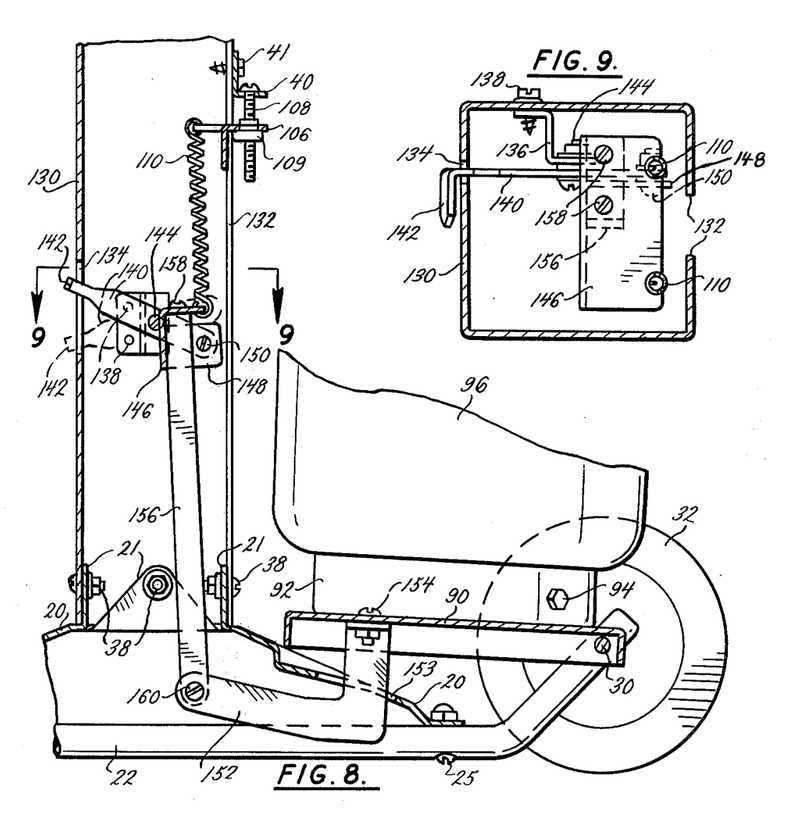
FIG. 8 is a vertical section through the lower portion of a further portable cooking grill which embodies the principles and teachings of the present invention.
FIG. 9 is a section which is taken along the plane indicated by the line 9—9 in FIG. 8.

Referring particularly to FIGS. 8 and 9, portions of a second portable cooking grill are shown. Most of the components of the portable cooking grill of FIGS. 8 and 9 will be identical to the corresponding components of the portable cooking grill of FIGS. 1-7, and hence many of those components are not repeated in FIGS. 8 and 9. Further, the components of the portable cooking grill which are repeated in FIGS. 8 and 9 bear the same numerals that were used in FIGS. 1-7.

The structure shown in FIGS. 8 and 9 differs from the structure shown in FIGS. 1-7 in the locations of the pointer, in the linkage between that pointer and the platform 90, and in the location of the slot for that pointer. Specifically, the numeral 130 denotes a pedestal which is similar to the pedestal 34 but which has a vertically-directed slot 134 in the front wall thereof. That slot is offset laterally from the vertically-directed slot 132 which corresponds to the vertically-directly slot 36 in the rear wall of the portable cooking grill of FIGS. 1-7. An L-shaped bracket 136 is secured to the inner face of one side of the pedestal 130 by self-tapping screws 138; and that bracket is close to the slot 134. The numeral 140 denotes a lever with a pointer 142 at the free end thereof; and that lever is rotatably secured to the bracket 136 by a pivot 144. The pointer 142 is located forwardly of, but adjacent to, the slot 134, as indicated by FIGS. 8 and 9. That slot permits the forward end of the lever 140, and the pointer 142 thereon, to move upwardly and downwardly.

An L-shaped connector 146 has an ear 148 that extends rearwardly therefrom; and a pivot 150 rotatably secures the rear end of the lever 140 to that ear. Helical extension springs 110 have the lower ends thereof hooked through openings in the connector 146, and those springs urge that connector upwardly. The upper ends of the springs 110 are supported by the ears of the T-shaped bracket 106; and an adjusting screw 108 can adjust the position of the bracket 106 relative to the bracket 40.

The numeral 152 denotes a bracket which is secured to the underface of the platform 90 by nut and bolt combinations 154. That bracket extends downwardly through a slot 153 in the base 20, and it has its forward end in register with the lower end of pedestal 130. A connecting lever 156 has the upper end thereof fixedly secured to the L-shaped connector 146 by nut and bolt combinations 158; and the lower end of that connecting lever is secured to the bracket 152 by a pivot 160.

The weight of the bottle 96 and of the gas therein will urge the forward end of the platform 90 downwardly, and hence will tend to cause bracket 152, pivot 160, connecting lever 156, connector 146 and pivot 150 to rotate the lever 140 to the position shown by solid lines in FIG. 8. The "empty" position of the pointer 142 on the free end of lever 140 is readily adjusted by using a screw driver to rotate the adjusting screw 108 to change the initial tension in the helical extension springs 110. As gas is used in the cooking of food, the combined weight of the bottle 96 and of the gas therein will decrease; and hence the springs 110 will be able to cause the connector 146, and hence the pivot 150, to move upwardly. The lever 140 will respond to such upward movement of pivot 150 to move the pointer 142 downwardly toward the "empty" position adjacent the lower end of slot 134. As a result, the embodiment of FIGS. 8 and 9, like the embodiment of FIGS. 1–7, will provide a direct, easy and clear indication to the user of the portable cooking grill that the supply of gas in the bottle 96 should be replenished.

The embodiment of FIGS. 8 and 9 is particularly useful where the portable cooking grill is not provided with a shelf or table 68, although that embodiment could be used with a grill having a shelf and table. However, where a shelf and table is provided for a portable cooking grill, it is desirable to use the embodiment of FIGS. 1–7; because the pointer 122 is immediately adjacent the knobs 82 and 84 and is not hidden or "shadowed" by the shelf or table 68.

Whereas the drawing and accompanying description have shown and described two preferred embodiments of the present invention, it should be apparent to those skilled in the art that various changes may be made in the form of the invention without affecting the scope thereof.

What I claim is:

1. An indicator which can indicate when the supply of gas in a standard removable bottle of liquefied petroleum gas needs to be replenished and which comprises a movable support on which said bottle of gas can be releasably supported, holding means holding said support for rotation about an axis, said axis being generally horizontal whereby said bottle can move, at least in part, vertically, positioning means which can releasably hold said bottle in position for movement with said support as said support rotates about said axis, said positioning means being adapted to permit ready movement of said bottle into and out of register with said support, said positioning means holding the center of gravity of said bottle a predetermined distance from said axis, said holding means and said support and said positioning means coacting to displace all parts of said bottle far enough away from all nearby objects to permit unobstructed rotation of said bottle with said support as said support rotates about said axis, indicating means that has at least a portion thereof which is displaced from said axis and which is movable when said support rotates about said axis and which is movable toward and away from an "empty" position that represents an "empty" condition of said bottle, and spring means coacting with, and providing a spring force for, said support to urge said support for rotation in a predetermined direction about said axis, and hence to urge said indicating means for movement toward said "empty" position, said spring means responding to the weight of said bottle and of the gas therein to yield and thereby permit said support to rotate in the opposite direction about said axis and thereby permit said indicating means to move away from said "empty" position, said spring means having an "empty" position indicating stress therein whenever said bottle is held by said positioning means and is "empty" and having a "full" position indicating stress therein whenever said bottle is held by said positioning means and is "full", said spring means applying said spring force at a second predetermined distance from said axis, said spring means being dimensioned so the product of the horizontal projection of said second predetermined distance and of said spring force, whenever said spring means has said "empty" position indicating stress therein, essentially equals the product of the horizontal projection of the first said predetermined distance and of the "empty" weight of said bottle to dispose said indicating means adjacent said "empty" position, said spring means also being dimensioned so the product of said horizontal projection of said second predetermined distance and of said spring force, whenever said spring has said "full" position indicating stress therein, essentially equals the product of said horizontal projection of said first said predetermined distance and of the "full" weight of said bottle to displace said indicating means away from said "empty" position, said holding means preventing accidental separation of said support from said holding means as said bottle is moved into and out of engagement with said positioning means and hence into and out of register with said support.

2. An indicator as claimed in claim 1 wherein a readily-accessible adjustable member can be adjusted to change said "empty" position indicating stress in said spring means and thereby change said spring force which is provided by said spring means at said second predetermined distance from said axis, whereby said indicating means can readily be disposed closely adjacent said "empty" position whenever said bottle and the regulator and hose therefor are completely empty.

3. An indicator, for a bottle-equipped, portable, gas-consuming device, which can indicate when the supply of gas in a standard removable bottle of liquefied petroleum gas for said gas-consuming device needs to be replenished and which comprises a movable support on which said bottle can be releasably supported, holding means holding said support for rotation about an axis, said axis being generally horizontal whereby said bottle can move, at least in part, vertically, positioning means which can releasably hold said bottle in position for movement with said support as said support rotates about said axis, said positioning means being adapted to permit ready movement of said bottle into and out of register with said support, said positioning means holding said bottle so the center of gravity of said bottle is a predetermined distance from said axis, said holding means and said support and said positioning means coacting to displace all parts of said bottle far enough away from all nearby objects to permit unobstructed rotation of said bottle with said support as said support rotates about said axis, indicating means that has at least a portion thereof which is displaced from said axis and which is movable when said support rotates about said axis and which is movable toward and away from an "empty" position that represents an "empty" condition of said bottle, spring means coacting with, and providing a spring force for said support to urge said support for rotation in a predetermined direction about said axis, and hence to urge said indicating means for movement toward said "empty" position, said spring means responding to the weight of said bottle and of the gas therein to yield and thereby permit said support to rotate about said axis and thereby permit said indicating means to move away from said "empty" position, said spring means having an "empty" position indicating stress therein whenever said bottle is held by said positioning means and is "empty" and having a "full" position indicating stress therein whenever said bottle is held by said positioning means and is "full", said spring means applying said spring force at a second predetermined distance from said axis, said spring means being dimensioned so the product of the horizontal projection of said second predetermined distance and of said spring force, whenever said spring means has said "empty" position indicating stress therein, essentially equals the product of the horizontal projection of the first said predetermined distance and of the "empty" weight of said bottle to dispose said indicating means adjacent said "empty" position, said spring means also being dimensioned so the product of said horizontal projection of said second predetermined distance and of said spring force, whenever said spring has said "full" position indicating stress therein, essentially equals the product of said horizontal projection of said first said predetermined distance and of the "full" weight of said bottle to displace said indicating means away from said "empty" position, said holding means preventing accidental separation of said support from said holding means as said bottle is moved into and out of engagement with said positioning means and hence into and out of register with said support, said indicating means being located adjacent an exterior surface of said portable gas-consuming device, and a readily-accessible adjacent member which can be adjusted to change said "empty" position indicating stress in said spring means and thereby change said spring force that is provided by said spring means at said second predetermined distance from said axis, said readily-accessible adjustable member also being located adjacent an exterior surface of said portable gas-consuming device.

4. An indicator, for a bottle-equipped, readily-portable, gas-fired cooking device that has a ground-engaging structure which can engage the ground or another supporting surface and that has a generally-vertical structure which holds a cooking chamber above the level of said ground-engaging structure and hence above the level of said ground or other supporting surface, which can indicate when the supply of gas in a standard removable bottle of liquefied petroleum gas for said gas-fired cooking device needs to be replenished and which comprises a movable support on which said bottle can be releasably supported, holding means holding said support for rotation about an axis and relative to said generally-vertical structure, said axis being generally horizontal whereby said bottle can move, at least in part, vertically, positioning means which can releasably hold said bottle in position for movement with said support as said support rotates about said axis, said positioning means being adapted to permit ready movement of said bottle into and out of register with said support, said holding means and said support and said positioning means coacting to displace all parts of said bottle far enough away from said generally-vertical structure to permit unobstructed rotation of said bottle with said support as said support rotates about said axis, indicating means that has at least a part thereof which is displaced from said axis and which is movable when said support rotates about said axis and which is movable toward and away from an "empty" position that represents an "empty" condition of said bottle, spring means coacting with, and providing a spring force for, said support to urge said support for rotation in a predetermined direction about said axis, and hence to urge said indicating means for movement toward said "empty" position, said spring means responding to the weight of said bottle and of the gas therein to yield and thereby permit said support to rotate in the opposite direction about said axis and thereby permit said indicating means to move away from said "empty" position, said holding means preventing accidental separation of said support from said holding means as said bottle is moved into and out of engagement with said positioning means and hence into and out of register with said support, connecting means between said indicating means and said movable support which interconnect said indicating means and said movable support so rotation of said movable support about said axis forces said indicating means to move, a substantial portion of said connecting means being disposed within, but being free to move relative to, said generally-vertical structure of said readily-portable cooking device, and said spring means being connected to said connecting means within said generally-vertical structure, said holding means holding at least a portion of said movable support below and in register with said cooking chamber, and said positioning means holding at least a portion of said bottle below and in register with said cooking chamber.

5. An indicator as claimed in claim 4 wherein said indicating means is located adjacent, and is movable relative to, an exterior surface of a table of said readily-portable cooking device, and wherein another part of said connecting means underlies, but is close to, said table.

6. An indicator which can indicate when the supply of gas in a bottle for a portable cooking grill needs to be replenished and which comprises a movable platform on which said bottle of gas can be supported for movement about an axis, a pointer that has at least a part thereof which is displaced from said axis and which is movable toward and away from a position that represents an "empty" condition of said bottle, connecting means which interconnect said pointer and said platform to enable movement of said platform to effect movement of said pointer toward and away from said position, and spring means coacting with, and providing a spring force for, said platform to urge said platform for movement in a predetermined direction relative to said axis, and hence to urge said indicating means for movement toward said position, said spring means responding to the weight of said bottle and of the gas therein to permit said platform to move in the opposite direction relative to said axis and thereby permit said pointer to move away from said position, one edge of said platform being pivoted to the base of said portable cooking grill, said connecting means being attached to said platform at a point spaced from said one edge, and the distance between the pivot point for said platform and the horizontal projection of the center of gravity of said bottle being less than the distance between that pivot point and the horizontal projection of the point of attachment of said platform to said connecting means, whereby a mechanical advantage greater than one-to-one is provided for the movement of a point on said platform which is in vertical registry with said center of gravity of said bottle about said pivot point for said platform when compared with the movement of said point of attachment about said pivot point for said platform.

7. An indicator for a bottle-equipped, readily portable, gas-fired cooking device that has a ground-engaging structure which can engage the ground or another supporting surface and that has a generally-vertical structure which holds a cooking chamber above the level of said ground-engaging structure and hence above the level of said ground or other supporting surface, which can indicate when the supply of gas in a standard removable bottle of liquefied petroleum gas for said gas-fired cooking device needs to be replenished and which comprises a movable support on which said bottle can be releasably supported, holding means holding said support for rotation about an axis and relative to said generally-vertical structure, said axis being generally horizontal whereby said bottle can move, at least in part, vertically, positioning means which can releasably hold said bottle in position for movement with said support as said support rotates about said axis, said positioning means being adapted to permit ready movement of said bottle into and out of register with said support, said holding means and said support and said positioning means coacting to displace all parts of said bottle far enough away from said generally-vertical structure to permit unobstructed rotation of said bottle with said support as said support rotates about said axis, indicating means which is movable when said support rotates about said axis and which is movable toward and away from an "empty" position that represents an "empty" condition of said bottle, said indicating means being located adjacent an exterior surface of a table of said readily-portable cooking device, connecting means between said indicating means and said movable support which interconnects said indicating means and said movable support so rotation of said movable support about said axis forces said indicating means to move, part of said connecting means being disposed within and being concealed and protected by said generally-vertical structure of said readily-portable cooking device, another part of said connecting means underlying, but being close to, said table, said indicating means moving through a path of movement that is largely located above the level of the top of said generally-vertical structure, a lever that has one end thereof displaced from said axis and which has said indicating means on said one end thereof, a pivot which pivotally supports said lever, said connecting means applying a force to said lever at a point which is intermediate said indicating means and said pivot for said lever to move said indicating means, whereby said indicating means moves further that said point on said lever, spring means coacting with, and providing a spring force for, said support to urge said support for rotation in a predetermined direction about said axis, and hence to urge said indicating means for movement toward said "empty" position, said spring means responding to the weight of said bottle and of the gas therein to yield and thereby permit said support to rotate in the opposite direction about said axis and thereby permit said indicating means to move away from said "empty" position, and said holding means preventing accidental separation of said support from said holding means as said bottle is moved into an out of engagement with said positioning means and hence into and out of register with said support.

8. An indicator, for a bottle-equipped, gas-consuming device, which can indicate when the supply of gas in a standard removable bottle of liquefied petroleum gas needs to be replenished and which comprises a movable support on which said bottle can be releasably supported, holding means holding said support for rotation about an axis, said axis being generally horizontal whereby said bottle can move, at least in part, vertically, positioning means which can releasably hold said bottle in position for movement with said support as said support rotates about said axis, said positioning means being adapted to permit ready movement of said bottle into and out of register with said support, said positioning means holding the center of gravity of said bottle a predetermined distance from said axis, said holding means and said support and said positioning means coacting to displace all parts of said bottle far enough away from all nearby objects to permit unobstructed rotation of said bottle with said support as said support rotates about said axis, indicating means that has at least a part thereof which is displaced from said axis and which is movable when said support rotates about said axis and which is movable toward and away from an "empty" position that represents an "empty" condition of said bottle, said indicating means being located adjacent and being movable relative to an exterior surface of said gas-consuming device, spring means coacting with, and providing a spring force for, said support to urge said support for rotation in a predetermined direction about said axis, and hence to urge said indicating means for movement toward said "empty" position, said spring means responding to the weight of said bottle and of the gas therein to yield and thereby permit said support to rotate in the opposite direction about said axis and thereby permit said indicating means to move away from said "empty" position, said spring means having an "empty" position indicating stress therein whenever said bottle is held by said positioning means and is "empty" and having a "full" position indicating stress therein whenever said bottle is held by said positioning means and is "full", said spring means applying said spring force at a second predetermined distance from said axis, said spring means being dimensioned so the product of the horizontal projection of said second predetermined distance and of said spring force, whenever said spring means has said "empty" position indicating stress therein, essentially equals the product of the horizontal projection of the first said predetermined distance and of the "empty" weight of said bottle to dispose said indicating means adjacent said "empty" position, said spring means also being dimensioned so the product of the horizontal projection of said second predetermined distance and of said spring force, whenever said spring has said "full" position indicating stress therein, essentially equals the product of said horizontal projection of said first said predetermined distance and of the "full" weight of said bottle to displace said indicating means away from said "empty" position, said holding means preventing accidental separation of said support from said holding means as said bottle is moved into and out of engagement with said positioning means and hence into and out of register with said support, said positioning means and said holding means and said support automatically fixing the horizontal position of said bottle and also automatically limiting the horizontal movement of said bottle, said positioning means and said holding means and said support and said spring means automatically coacting with said weight of said bottle and of the gas therein to determine the vertical position of said bottle.

9. An indicator, for a bottle-equipped, gas-consuming device, which can indicate when the supply of gas in a standard removable bottle of liquefied petroleum gas for said gas-consuming device needs to be replenished and which comprises a movable support on which said bottle can be releasably supported above an underlying surface, holding means holding said support for rotation about an axis, said axis being generally horizontal whereby said bottle can move, at least in part, vertically relative to said underlying surface, positioning means which can releasably hold said bottle in position for movement with said support as said support rotates about said axis, said positioning means being adapted to permit ready movement of said bottle into and out of register with said support, said holding means holding said support close to said underlying surface so the bottom of said bottle is close to said underlying surface, said holding means and said support and said positioning means coacting to displace all parts of said bottle far enough away from all nearby objects to permit unobstructed rotation of said bottle with said support as said support rotates about said axis, indicating means that has at least a part thereof which is displaced from said axis and which is movable when said support rotates about said axis and which is movable toward and away from an "empty" position that represents an "empty" condition of said bottle, and spring means coacting with, and providing a spring force for, said support to urge said support for rotation in a predetermined direction about said axis, and hence to urge said indicating means for movement toward said "empty" position, said spring means responding to the weight of said bottle and of the gas therein to yield and thereby permit said support to rotate in the opposite direction about said axis and thereby permit said indicating means to move away from said "empty" position, said positioning means and said holding means and said support automatically fixing the horizontal position of said bottle relative to said underlying surface and also automatically limiting the horizontal movement of said bottle relative to said underlying surface during rotation of said support about said axis, said positioning means and said holding means and said support and said spring means automatically coacting with said weight of said bottle and of the gas therein to determine the vertical position of said bottle relative to said underlying surface.

10. An indicator, for a bottle-equipped, readily-portable, gas-fired cooking device that has a ground-engaging structure which can engage the ground or another supporting surface and that has a generally-vertical structure which holds a cooking chamber above the level of said ground-engaging structure and hence above the level of said ground or other supporting surface, which can indicate when the supply of gas in a standard removable bottle of liquefied petroleum gas for said gas-fired cooking device needs to be replenished and which comprises a movable support on which said bottle can be releasably supported, holding means holding said support for rotation about an axis and relative to said ground-engaging structure and also relative to said generally-vertical structure and said cooking chamber, said axis being generally horizontal whereby said bottle can move, at least in part, vertically relative to said ground-engaging structure and said cooking chamber, positioning means which can releasably hold said bottle in position for movement with said support as said support rotates about said axis, said positioning means being adapted to permit ready movement of said bottle into and out of register with said support, said positioning means holding the center of gravity of said bottle a predetermined distance from said axis, said holding means and said support and said positioning means coacting to displace all parts of said bottle far enough away from said generally-vertical structure and said cooking chamber to permit unobstructed rotation of said bottle with said support as said support rotates about said axis, indicating means that has at least a part thereof which is displaced from said axis and which is movable when said support rotates about said axis and which is movable toward and away from an "empty" position that represents an "empty" condition of said bottle, said holding means holding said support close to said ground or other supporting surface so the bottom of said bottle is close to said ground or other supporting surface, and spring means coacting with, and providing a spring force for, said support to urge said support for rotation in a predetermined direction about said axis, and hence to urge said indicating means for movement toward said "empty" position, said spring means responding to the weight of said bottle and of the gas therein to yield and thereby permit said support to rotate in the opposite direction about said axis and thereby permit said indicating means to move away from said "empty" position, said holding means positioning said support so at least a part of said support is overlain by said cooking chamber, whereby said positioning means can hold at least a part of said bottle below and in register with said cooking chamber, said spring means having an "empty" position indicating stress therein whenever said bottle is held by said positioning means and is "empty" and having a "full" position indicating stress therein whenever said bottle is held by said positioning means and is "full", said spring means applying said spring force at a second predetermined distance from said axis, said spring means being dimensioned so the product of the horizontal projection of said second predetermined distance and of said spring force, whenever said spring means has said "empty" position indicating stress therein, essentially equals the product of the horizontal projection of the first said predetermined distance and of the "empty" weight of said bottle to dispose said indicating means adjacent said "empty" position, said spring means also being dimensioned so the product of said horizontal projection of said second predetermined distance and of said spring force, whenever said spring has said "full" position indicating stress therein, essentially equals the product of said horizontal projection of said first said predetermined distance and of the "full" weight of said bottle to displace said indicating means away from said "empty" position, said holding means preventing accidental separation of said support from said holding means as said bottle is moved into and out of engagement with said positioning means and hence into and out of register with said support.

11. An indicator, for a bottle-equipped, readily-portable, gas-fired, cooking device that has a ground-engaging structure which can engage the ground or any other supporting surface and that has a generally-vertical structure which holds a cooking chamber above the level of said ground-engaging structure and hence above the level of said ground or other supporting surface which can indicate when the supply of gas in a standard removable bottle of liquefied petroleum gas for said gas-fired cooking device needs to be replenished and which comprises a movable support on which said bottle can be releasably supported, holding means holding said support for rotation about an axis, said axis being generally horizontal whereby said bottle can move, at least in part, vertically, relative to said cooking chamber, said holding means holding said support below the level of said cooking chamber with at least a part of said movable support below and in vertical registry with said cooking chamber, positioning means which can releasably hold said bottle in position for movement with said support as said support rotates about said axis, said positioning means being adapted to permit ready movement of said bottle into and out of register with said support, said holding means holding said support close to said ground or other supporting surface so the bottom of said bottle is close to said ground or other supporting surface, said holding means and said support and said positioning means coacting to displace all parts of said bottle far enough away from said generally-vertical structure and from said cooking chamber to permit unobstructed rotation of said bottle with said support as said support rotates about said axis, indicating means that has at least a part thereof which is displaced from said axis and which is movable when said support rotates about said axis and which is movable toward and away from an "empty" position that represents an "empty" condition of said bottle, and spring means coacting with, and providing a spring force for, said support to urge said support for rotation in a predetermined direction about said axis, and hence to urge said indicating means for movement toward said "empty" position, said spring means responding to the weight of said bottle and of the gas therein to yield and thereby permit said support to rotate in the opposite direction about said axis and thereby permit said indicating means to move away from said "empty" position, said holding means preventing accidental separation of said support from said holding means as said bottle is moved into and out of engagement with said positioning means and hence into and out of register with said support, said positioning means and said support automatically disposing the center of gravity of said bottle within a horizontal area which is defined by said ground-engaging structure, and below the level of said cooking chamber, the automatic disposition of said center of gravity of said bottle within said horizontal area and below the level of said cooking chamber enabling said ground-engaging structure to resist tilting of said gas-fired cooking device despite the application of laterally-directed forces to said cooking chamber of said gas-fired cooking device.

12. An indicator, for a bottle-equipped, readily-portable gas-fired cooking device that has a ground-engaging structure which can engage the ground or another supporting surface and that has a generally-vertical structure which holds a cooking chamber above the level of said ground-engaging structure and hence above the level of said ground or other supporting surface, which can indicate when the supply of gas in a standard removable bottle of liquefied petroleum gas for said gas-fired cooking device needs to be replenished and which comprises a movable support on which said bottle can be releasably supported, holding means holding said support for rotation about an axis and relative to said generally-vertical structure and said ground-engaging structure and said cooking chamber, said axis being generally horizontal whereby said bottle can move, at least in part, vertically relative to said ground-engaging structure and relative to said cooking chamber, positioning means which can releasably hold said bottle in position for movement with said support as said support rotates about said axis, said positioning means being adapted to permit ready movement of said bottle into and out of register with said support, said positioning means holding the center of gravity of said bottle a predetermined distance from said axis, said holding means holding at least a portion of said movable support below and in register with said cooking chamber, said positioning means holding at least a portion of said bottle below and in register with said cooking chamber, said holding means and said support and said positioning means coacting to hold said bottle adjacent said generally-vertical structure while displacing all parts of said bottle far enough away from said generally-vertical structure and said cooking chamber to permit unobstructed rotation of said bottle with said support as said support rotates about said axis, said positioning means being located below the level of said cooking chamber a distance appreciably greater than the height of said bottle to permit ready movement of said bottle into and out of engagement with said positioning means and hence into and out of register with said support, indicating means that has at least a part thereof which is displaced from said axis and which is movable when said support rotates about said axis and which is movable toward and away from an "empty" position that represents an "empty" condition of said bottle, spring means coacting with, and providing a spring force for, said support to urge said support for rotation in a predetermined direction about said axis, and hence to urge said indicating means for movement toward said "empty" position, said spring means responding to the weight of said bottle and of the gas therein to yield and thereby permit said support to rotate in the opposite direction about said axis and thereby permit said indicating means to move away from said "empty" position, said spring means having an "empty" position indicating stress therein whenever said bottle is held by said positioning means and is "empty" and having a "full" position indicating stress therein whenever said bottle is held by said positioning means and is "full", said spring means applying said spring force at a second predetermined distance from said axis, said spring means being dimensioned so the product of the horizontal projection of said second predetermined distance and of said spring force, whenever said spring means has said "empty" position indicating stress therein, essentially equals the product of the horizontal projection of the first said predetermined distance and of the "empty" weight of said bottle to dispose said indicating means adjacent said "empty" position, said spring means also being dimensioned so the product of said horizontal projection of said second predetermined distance and of said spring force, whenever said spring has said "full" position indicating stress therein, essentially equals the product of said horizontal projection of said first said predetermined distance and of the "full" weight of said bottle to displace said indicating means away from said "empty" position, said holding means preventing accidental separation of said support from said holding means as said bottle is moved into and out of engagement with said positioning means and hence into and out of register with said support, an adjustable member which can be adjusted to change said "empty" position indicating stress in said spring means and thereby change said spring force which is provided by said spring means, said adjustable member being adjacent and being movable relative to an exterior surface of said gas-fired cooking device, whereby said adjusting member can easily be adjusted to change said "empty" position, and connecting means between said indicating means and said movable support to interconnect said indicating means and said movable support so rotation of said movable support about said axis forces said indicating means to move, a substantial portion of said connecting means be ing disposed within, but being free to move relative to, said generally-vertical structure of said readily-portable cooking device, said spring means being connected to said connecting means within said generally-vertical structure.

* * * * *